United States Patent
Rezaei

(10) Patent No.: US 10,733,250 B2
(45) Date of Patent: *Aug. 4, 2020

(54) METHODS AND APPARATUS FOR MATCHING RELEVANT CONTENT TO USER INTENTION

(71) Applicant: NETSEER, INC., Menlo Park, CA (US)

(72) Inventor: Behnam A. Rezaei, Los Angeles, CA (US)

(73) Assignee: NETSEER, INC., Menlo Park, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/810,773

(22) Filed: Nov. 13, 2017

(65) Prior Publication Data

US 2018/0075150 A1    Mar. 15, 2018

Related U.S. Application Data

(63) Continuation of application No. 11/923,546, filed on Oct. 24, 2007, now Pat. No. 9,817,902.

(60) Provisional application No. 60/854,842, filed on Oct. 27, 2006.

(51) Int. Cl.
| | |
|---|---|
| *G06F 16/00* | (2019.01) |
| *G06F 16/9535* | (2019.01) |
| *G06F 16/2457* | (2019.01) |
| *G06Q 10/02* | (2012.01) |

(52) U.S. Cl.
CPC .... *G06F 16/9535* (2019.01); *G06F 16/24575* (2019.01); *G06Q 10/02* (2013.01)

(58) Field of Classification Search
CPC .................................................. G06F 16/9535
USPC .................................................. 707/737, 732
See application file for complete search history.

(56) References Cited

U.S. PATENT DOCUMENTS

| | | | | |
|---|---|---|---|---|
| 5,956,708 | A * | 9/1999 | Dyko | G06F 16/94 |
| 2003/0115191 | A1 * | 6/2003 | Copperman | G06F 16/9038 |
| 2005/0222900 | A1 * | 10/2005 | Fuloria | G06Q 30/02 705/14.54 |
| 2006/0047649 | A1 * | 3/2006 | Liang | G06F 16/338 |
| 2006/0218035 | A1 * | 9/2006 | Park | G06Q 30/02 705/14.53 |
| 2007/0038614 | A1 * | 2/2007 | Guha | G06Q 30/02 |
| 2008/0140491 | A1 * | 6/2008 | Jain | G06O 30/02 705/14.47 |

* cited by examiner

*Primary Examiner* — Chelcie L Daye

(57) ABSTRACT

Methods and apparatus for a new approach to the problem of matching relevant content to user queries. Instead of looking for the exact keyword, the invention expands it into groupings of concepts and phrases, where each such group represents one possible user intention (as implied by the query phrase or keyword). Each such grouping is analyzed to provide relevant content, including but not limited to, unstructured data like world wide web, categorized data and paid listings. The provided method can better capture user intentions even for cases where there is no click-through information.

20 Claims, 6 Drawing Sheets

METHODS AND APPARATUS FOR MATCHING RELEVANT CONTENT TO USER INTENTION

CROSS-REFERENCE TO RELATED APPLICATIONS

This application is a continuation of U.S. patent application Ser. No. 11/923,546, filed Oct. 24, 2007, titled "METHODS AND APPARATUS FOR MATCHING RELEVANT CONTENT TO USER INTENTION", now issued U.S. Pat. No. 9,817,902, issued Nov. 14, 2017, and claims the benefit of priority under 35 U.S.C. 119 of U.S. Provisional Patent Application No. 60/854,842, filed on Oct. 27, 2006. The subject matter of each is hereby incorporated by reference in their entirety.

FIELD OF THE INVENTION

The present invention relates in general to methods for analyzing user intention and matching relevant content to the intention of the user and, in particular, to any unstructured data like webpages, any categorized data like encyclopedia or merchant information, and paid listings.

DESCRIPTION OF THE RELATED ART

Most conventional information retrieval systems are designed to retrieve relevant contents from a data repository, based on inputs from users. The user input can be in any of the following forms: (i) a set of keywords, (ii) single or multiple lists of URLs and domains, and (iii) a set of documents (e.g., one or more text files). The goal of such conventional information retrieval systems is to pull the most relevant contents (i.e., most relevant to the given input) from the underlying repository, which might itself consist of a heterogeneous set of structured and unstructured content. An example of the aforesaid conventional information retrieval system is a traditional search engine, where a user provides a set of keywords, and the search engine provides simple ranked lists of top relevant web pages, and a separate list of top relevant paid listings or sponsored links. The set of web pages matching user's search query and the advertisement database containing sponsored advertising materials are currently two separate databases that are processed very differently to pull the relevant pages and the sponsored links for the same user query. Thus, the conventional search engine described above provides an example of two distinct information repositories being processed in response to the same query.

A number of techniques have been proposed for retrieving relevant web pages. For example, the global structure of the hyperlinks is used to calculate a score (commonly known as the Page rank) for each crawled page in the World Wide Web (WWW), and during query time, this global score is combined with the semantic score provided by an inverted index to determine the total relevancy score of every page for a given query. The pages are then displayed in decreasing order of their relevancy scores, along with some randomization, so that low ranking pages are sometimes pushed higher up the list. There are several issues regarding how well the resulting flat list of pages can capture user intention, and more importantly, how easy is it for the users to find the "knowledge" that they are seeking through such an interface. Several alternative methods have been proposed, and for most parts of this invention, we assume that there are various methods for finding web pages and concepts that are most relevant to a user's query, as derived from the WWW. Such methods include, the well-known page rank method, as well as, more recent methods such as (i) clustering of concepts and extraction of relevant phrases from the top pages returned by different search engines, (ii) matching of queries and pages to categorized databases, and guided navigation based on predefined concepts (as practiced by the "vertical" search engines), and (iii) a fundamentally different method, where the web is preprocessed to construct a Knowledge-Bank (KB) comprising concepts and their relationships, and the user queries are matched to the KB and related pages, to provide a dynamical hierarchical listings of relevant concepts and relevant pages. That is, given a query, the returned pages and related concepts are grouped, where each such group represents a distinct context or a potential user intention.

In contrast to the relatively rich field of study on how to search and organize web pages, the related problem of searching auxiliary databases and merging the results obtained from different such databases in meaningful ways has lagged behind. For example, the current methods for retrieving paid listings for a given query can be described as follows: the query keywords are first matched with a database that has all the keywords and phrases that the advertisers have already bid on, and a potential list of sponsored links that match the given query phrase are selected. Then, various cost functions based on clickthrough and bid amount have been proposed to select the final list of sponsored links that are to be displayed. In particular, the sponsored-links database is queried based only on the keywords provided by the user. This strategy thus keeps the directory of web pages (i.e., the Internet), and the directory used for pulling ads separate. The relevancy of the sponsored links to the organic results obtained from the web pages, and the underlying user intentions are thus not apparent. For example, at the time of the reporting of this invention, a query for the phrase "Pontiac Fever" returns sponsored links talking about Pontiac cars. This is because, the sellers of Pontiac cars have bid for query phrases that have the word Pontiac in them, and the ad-server looks only at the ad-words database to pull the ads. The phrase "pontiac fever", however, refers to infections due to the Legionella bacteria (that could thrive in water tanks and cooling towers and spread through the air ventilation system in a confined work or living space), and the organic search results do have related concepts, such as Legionnaire's disease, air purifiers etc. The ads shown currently, however, miss this most important user intention underlying the phrase "pontiac fever." Ideally, the organic search results themselves should be grouped into different contexts or "user intentions", e.g., a group related to the Legionella bacteria and infections, another group related to commercial products related to the prevention and treatment of pontiac fever (such as air purifiers, water treatment equipments etc.), and yet another group that talks about popular Pontiac cars. The relevant ads from the ad-server database can then be pulled for each such context or user intention.

The deficiencies of the current methods are captured in some of the following statistics: current search engines return over 40% of queries with no paid listing. One can show empirically that for a significant fraction of such queries, the web pages do have content (even if one constrained themselves to examining only the titles and snippets of such pages) that match the keywords and phrases that advertisers have already bid for. Thus, not displaying sponsored-links result in a waste of advertisement real estate space and brings out the problems inherent in existing algorithms. Furthermore, even for queries with paid listings there is an average click-through of about 20%, versus about 80% for organic results. Again, one can show empirically that for a significant fraction of such queries, the ads that match meaningful organic concepts are not displayed. This fact alone could explain the low click through rates for sponsored links in existing search engines. Thus, as shown above, the existing techniques for matching relevant content to the invention of the user fail to achieve effective monetization of the Internet. For this reason, an improved technology is required.

SUMMARY OF THE INVENTION

The inventive methodology is directed to methods and systems that substantially obviate one or more of the above and other problems associated with conventional techniques for analyzing user intention and matching relevant content to the invention of the user.

Methods and apparatus for a new approach to the problem of matching relevant content to user queries. Instead of looking for the exact keyword, the invention expands it into groupings of concepts and phrases, where each such group represents one possible user intention (as implied by the query phrase or keyword). Each such grouping is analyzed to provide relevant content, including but not limited to, unstructured data like world wide web, categorized data and paid listings. The provided method can better capture user intentions even for cases where there is no click-through information.

In accordance with one aspect of the inventive methodology, there is provided a method for matching relevant content to the invention of the user. Inventive method involves receiving input information from a user, the input information being specified by the user or automatically determined from a history of online activities of the user; using the input information to obtain a plurality of top web pages, a plurality of concepts and at least one keyword related to at least a portion of the input information and generating a summary of the related concepts in the plurality of concepts using the obtained top web pages and the obtained plurality of concepts. The inventive method further involves grouping the top related concepts in the plurality of concepts together into at least one concept group. The aforesaid at least one concept group represents a potential intention of the user. The at least one concept group is used to determine user intention relevant information from at least one categorized database.

In accordance with another aspect of the inventive methodology, there is provided a system for matching relevant content to the invention of the user. The inventive system incorporates an input information module for determining input information. This input module is configured to receive the input information from a user or automatically determine the input information from a history of online activities of the user. The inventive system further includes a page-concept index including a plurality of categorized data items, each data item being tagged with related concept information; a search interface configured to obtain top categorized data from online information resources; and an advertising information pool containing advertising materials and related concept information. The inventive system further includes a concept graph incorporating information on multiple concepts and relationships among these multiple concepts; and an output interface configured to output user intention relevant information.

In accordance with yet another aspect of the inventive methodology, there is provided a computer-readable medium embodying a set of computer-readable instructions implementing a method for matching relevant content to the invention of the user. Inventive method involves receiving input information from a user, the input information being specified by the user or automatically determined from a history of online activities of the user; using the input information to obtain a plurality of top web pages, a plurality of concepts and at least one keyword related to at least a portion of the input information and generating a summary of the related concepts in the plurality of concepts using the obtained top web pages and the obtained plurality of concepts. The inventive method further involves grouping the top related concepts in the plurality of concepts together into at least one concept group. The aforesaid at least one concept group represents a potential intention of the user. The at least one concept group is used to determine user intention relevant information from at least one categorized database.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
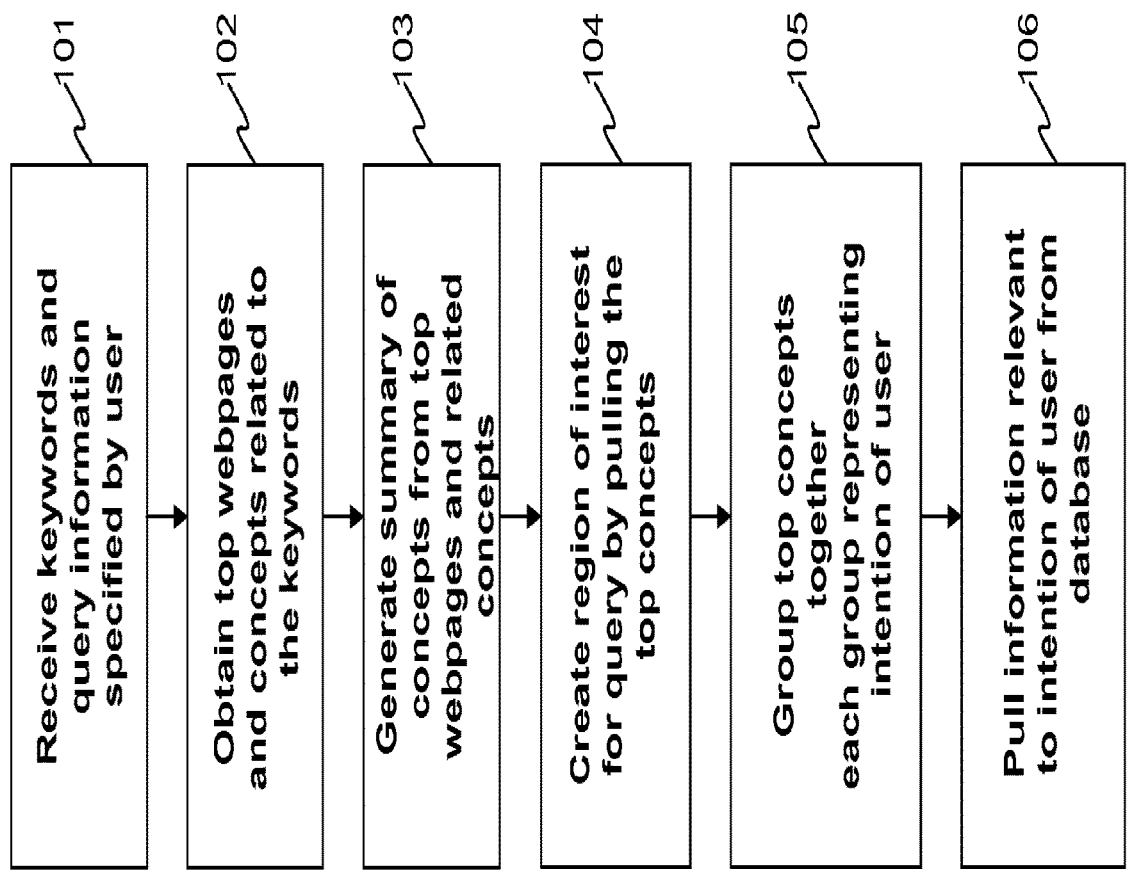
FIG. 1 illustrates an exemplary operating sequence of an embodiment of the inventive concept.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Because the management of the advertisement database, both how it is constructed and how it is matched to queries, is critical to the monetization of the Internet, the underlying requirements will first be examined in more detail.

Major Constituents of Advertisement Cycle

There are three major constituents of Advertisement Cycle which can affect clickthrough, quality of traffic and rate of conversion at destination website:

(1) Matching Advertisement to the query: In the current systems, many queries do not have Ads or have only few ads. By providing increased guiding to users (e.g., via vertical engines) it becomes harder to match ads in the traditional keyword-based framework. The existing set up also performs poorly in contextual matching of Ads. Moreover, the click through analysis used for matching the best ads to a given query, fail for a good percentage of queries because they only have few user queries for these phrases.

(2) Clickability: Showing the right snippet for a sponsored link is key to its clickability, i.e., how likely is the user to follow the link. Currently, the Ads do not have enough diversity; in fact, one can show empirically that for a significant fraction of queries, the diversity in the text of the ads is even worse than the diversity in the organic results. For example, for the query "loan" most of the ads highlight only the word "loan" in the text and most of them only mention "home loans" in the snippets. However, the same sponsors (i.e., the lending financial institutions) do provide services for other types of loans, and the organic search results do correspond to a whole spectrum of loans, including "car loans", "student loans", "credit card loans," etc. Thus existing results miss the full spectrum of intentions behind the query "loan", and miss the opportunity to capture clicks for users who might be looking for loans other than home loans.

(3) Redirection of user to destination or landing website: Once a user clicks on a sponsored link, it is important that the content of the landing or the destination site matches the intention of the users. Currently, the engines only pass the query to the destination website. However, it would be much more informative for the advertiser if the engine can pass a summary of the contents of the set of organic pages, or the context of the user intention. That would help the advertiser to better craft the landing site information.

While the advertisement database and the associated networks constitute an important auxiliary corpus (the Internet comprising hyper-linked web pages is of course the primary corpus), there are several other databases that can be integrated with the web to enrich the results for the users. For example, one of the potential applications of the invention framework proposed herein is the integration of the knowledge and concepts in the USPTO patent database with that of the web: given a query, one can find the related documents and concepts from the combined knowledge bank and data repositories. A new procedure for a certain surgery, for example, might not be represented very well in the Internet, and hence, will be difficult to find as a top relevant concept if one restricted oneself only to the Internet. However, the technology for the said procedure might have a very strong presence in the USPTO database, and one can leverage this information to provide better service for the users (i.e., if one queries for the said surgery in a search engine, then one can also return documents related to the new procedure), and combine rich concepts from both the sources. The benefits of being able to search concepts and documents from the general web that are important for the concepts in the patent database (there by, expanding the scope of the information that a user can access) are numerous. In general, one can extend the same framework and also incorporate the rich set of databases comprising scientific and professional publications. Both the USPTO patent database and the publication database have rich contextual structures that complement the hyperlink structure of the WWW.

Thus, one of the motivations behind the inventive concept is to leverage the content and concepts derived from heterogeneous sets of related documents (e.g., the WWW, USPTO patents, professional publication databases, the advertisement and sponsored links databases etc.) so that the overall results returned to the users have more relevant contents with high diversity to match users' potential intentions. In the particular case of the database consisting of sponsored links (which needs to be processed to retrieve ads that are most relevant to the given query), the objective is to utilize the user intention captured from the web pages and other databases (by any or a plurality of the above-mentioned methods), and to determine the relevant ads and determine their wordings, such that an objective cost function (e.g., a combined measure of user satisfaction, revenue for the portal and the quality of traffic and return on investment (ROI) for the advertisers) is maximized.

The present invention takes advantage of various technologies that can predict user intention from a heterogeneous set of data repositories ((e.g., the WWW, USPTO patents, professional publication databases, the advertisement and sponsored links databases etc.), and generate groups of relevant concepts that can cover various intentions of the user. To be more precise, user intention defined herein is a number of groupings of concepts, where each such grouping covers one aspect of the topic that the user could be looking for, when he uses a particular query phrase or keywords. The information can then be used to pull relevant contents including but not limited to unstructured data like webpages, categorized data like shopping records and encyclopedia, and paid listings. Various embodiments of the present invention include a method to help marketing services by providing potential user intentions as groups of concepts relevant to a particular user input. Various embodiments of the present invention also include a method to create a new advertisement paradigm and business model based on user intention versus current keyword paradigm. Various embodiments of the present invention further include a method to help guiding the users find relevant information, and help advertisers put ads in this conceptual advertisement paradigm. Various embodiments of the present invention further include a number of variations of the method to take advantage of existing keyword ad networks and keyword based search engines.

According to various embodiments of the present invention, based on the input result set, all or a subset of the following steps or variations of them are to be executed. Various embodiments of the present invention may include the following steps, which are illustrated in FIG. 1.

With reference to FIG. 1, in step 101, keywords or other search terms or a text file or webpage are directly specified by the user or indirectly provided by user behavior. Examples for directly is users typing search keywords into search engine search boxes, and for indirectly is a webpage user is browsing or a web service user using. In step 102, using the input information of step 101, a search engine first pulls top webpages related to those keywords from a proprietary index as well as other search engines. It also pulls related concepts and keywords matching the input from a Concept Graph repository. In one embodiment of the invention first neighbor concepts of the input query are matched as top related concepts. The produced web pages may be pre-tagged with relevant concepts or may be tagged in realtime. In step 103, a summary of the concepts is generated from the top pages and concepts returned in step 102. The region of interest for the query is then created in step 104 by matching the top concepts and their relationships from a concept relations repository or is calculated in real time from the top pages returned in step 102. In step 105, the top concepts are grouped together so that each group represents a potential intention of the user. The grouping can be done using any traditional graph or text clustering. Based on the application, in step 106, relevant information or records are pulled from the categorized database like advertisement, or categorized shopping related data.

Further according to various embodiments of the present invention, the results of processing according to the present invention (i.e., the final groupings of concepts and the related documents) may be used in different ways and post-processed to provide different services. The results may be examined, for example, with a semantic post processing, to refine semantic relations of the concepts based on meta search. This analysis may be further refined taking into account click through and value of the concepts and intentions based on users usage. Thus, click through information could, for example, be used to determine which of the user intentions are more relevant. Further processing according to the present invention and previous history of a user, yields a personalized grouping of user intention unique to each user or set of users. Such further processing may also take advantage of social networking of users and sharing of such information and intentions among users. Thus, certain user intentions could be judged to be much more relevant to a particular group of users, based on their past usage patterns and the set of concepts and documents that the group considers important.

Among the advantages of various embodiments of the present invention is the increase in the click through of the paid listings. The embodiments of the present invention also provide a means for maximizing revenue (e.g., based on the cost-per-click (CPC) model) for the portals, as well as maximizing the return on-investment (ROI) for the service/product providers. A further advantage of embodiments of the present invention is higher user satisfaction and easier and more effective and targeted marketing framework and methodology. Yet another advantage of the present invention is that it may be implemented with a real time function to retrieve content and paid listings in real time in order to enrich the final results.

Various embodiments of the present invention further include a method for providing contextual advertisement implemented by mapping the given web page to a region of interest of top concepts and their relationships, and thus, generating potential intentions of users reading the webpage. The results may be further refined by using manually generated advertisement and target profiling data, or by analyzing the content of the pages that are used to reach the page under consideration. Once the potential intentions of the readers of the page are identified, the related concepts can be used to pull ads from the advertisement database.

Various embodiments of the present invention further include a method and software programming product for generating relevant texts for the sponsored links (e.g., title, snippet, URL) to provide intention diversity in the paid listings. It can also provide more information to the landing website (the destination website when a paid listing is clicked) to better match the user intention and achieve higher conversion. For example, the current invention could pass a summary of the user intention (i.e., the grouped concepts and phrases) to the landing site, allowing the service provider to better target the user and, thus, increase the chance of a transaction or a purchase by the user.

The various embodiments of the present invention further include a method and software for generating organic search results from unstructured data (including but not limited to webpages and documents on the web) and categorized data, generated by pulling results from different intentions and mixing the results in various ways. The results can be mixed to generate a flat list, or provide different results in different sections. For example, for the query word "ulcers" an embodiment of the invention could generate three primary user intentions, i.e., groups of concepts related to "stomach ulcers", "mouth ulcers", and "foot ulcers". The embodiment can then be used to obtain documents (e.g., web pages, or patents, or ads, or publications) related to each such intention, and then presenting the diverse set of results to the user as a mixed flat list, or grouped according to the different intentions.

Apparatus according to the present invention includes firmware for finding relevant user intentions according to the present invention, and hardware loaded with software encoding user intention based algorithm according to the present invention. Apparatus according to the present invention also include computer readable media encoding an intention-based content matching algorithm according to the present invention.

Now, various embodiments of the inventive concept will be described in detail. The input information set that is provided to the inventive system in step 101 shown in FIG. 1 can include, depending on the application, a set of keywords, one or more URLs and domains, and/or a set of documents. As an example, not limiting the scope of the invention, in one embodiment, a search engine can provide input keywords to the inventive system. In another embodiment, contextual advertisement applications can provide the URL and related URLs that the ad is to appear on to the inventive system or advertisers can upload their marketing documents to get concepts and user intentions relevant to their products and services.

The input data set is preprocessed, if needed, to generate a number of important concepts (as an example, not limiting the scope of the invention, the inventive system can find important concepts from the concept repository in the provided document to create the list of user inputs using any state of the art method). The information is then used to query an inventive Page-Concept Index. The query can be made using variations of state of the art keyword based text querying, including but not limited to keyword query, phrase query, and proximity query. Based on the complete results set or a subset of top result-sets, a region of interest of related concepts relevant to user input are identified. The relationship between the concepts are then retrieved from concept relationship repository. The information is further enriched by optionally pulling click-through and bidding information of these concepts and prior history of user's activities. This information can be further enriched optionally by pulling contents from top search engines and other categorized and vertical searches and doing real time concept extraction and clustering using state of the art semantic and structural clustering methods. The region of interest is then divided into multiple regions each representing a user intention context. The region of interest can be refined and guided to provide different levels of resolution. This information can then be used for various applications.

In one preferred embodiment of the invention for improving click-through rates, the information is fed back to user to help in diversifying paid listing and organic search results. In another preferred embodiment of the invention, the input is a set of one or more webpages or domains, and the information can then be used to provide relevant advertisement on the pages, in conjunction with a user profiling and marketing database. Another preferred embodiment of the invention provides a list of concepts and phrases to help advertisers manage their keyword ad campaign. Another preferred embodiment of the invention provides a concept and intention based ad network, where the advertisers can bid on different user intentions and the engine provides groupings of paid listings for the input query. Another preferred embodiment of the invention provides relevant titles and snippets to the input query to provide highest clickability.

Another preferred embodiment of the invention returns top categorized data, such as records and shopping listings with high diversity to match user intention. This can combine the knowledge of various structured and unstructured sources of data, to provide a better search on categorized data. An example, but not limiting the scope of the invention, is when the input query is "black dress Oscars"; by hitting the web index and concept repository, the inventive engine finds that top related concepts might include, "versace", "one shouldered", "caftan", and a name of an actress. The inventive engine then retrieves the related products, based on this description, from the shopping records. Note that if the same categorized shopping directory and records are directly queried with the phrase "black dress Oscars" then most probably it would not return any match. However, by leveraging the knowledge of the web and other databases, one is able to better match user intention and widen the scope of the given database. This way the knowledge of the web is combined with knowledge of the categorized data. The same can be applied to other categorized data including but not limited to patents, papers, shopping listings, local listings, service listings and auctions.

Figure 2:
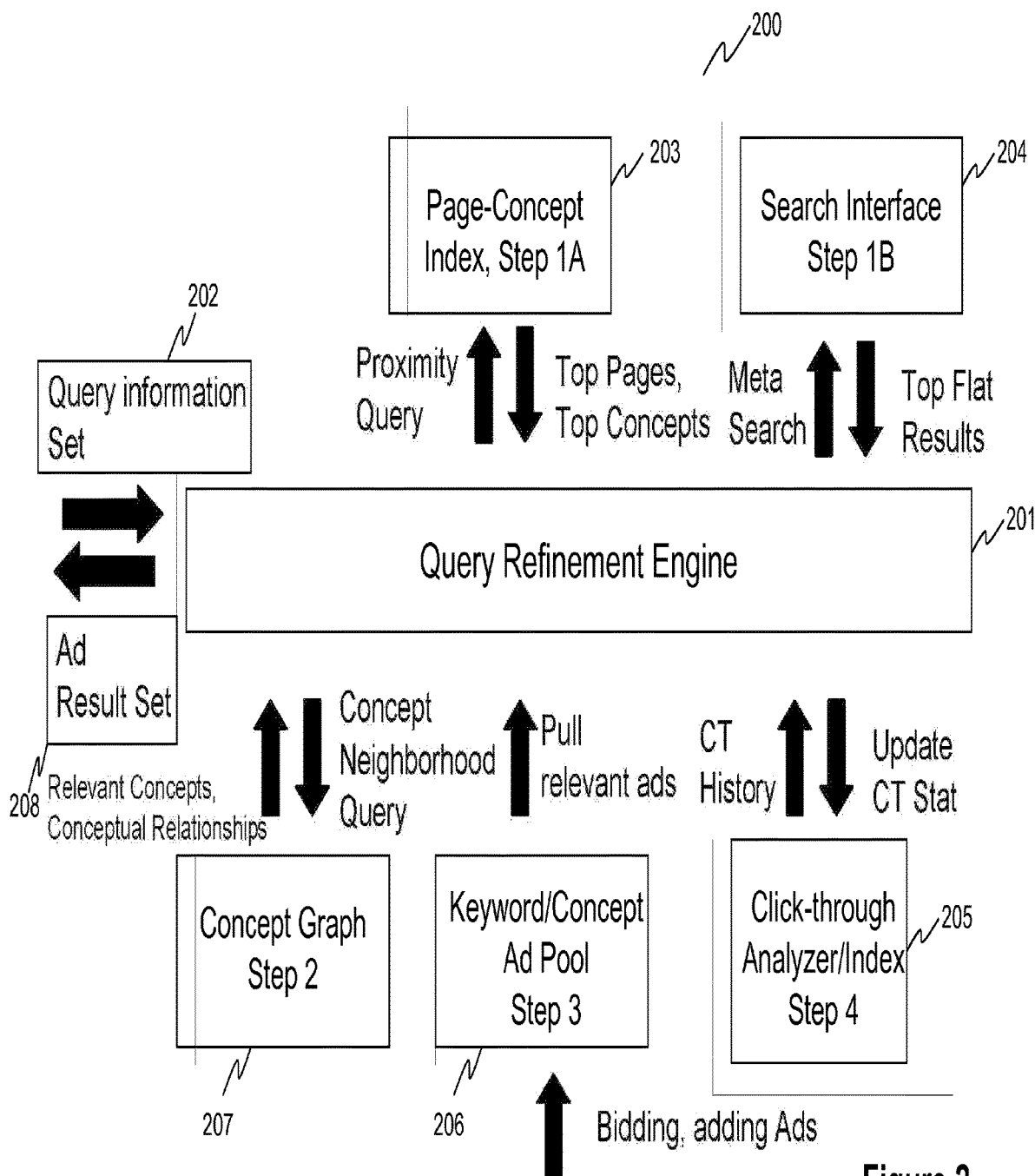
FIG. 2 is a schematic block diagram of a method and architecture and various components of the system according to one embodiment of the invention.

FIG. 2 Illustrates an exemplary architecture of the inventive query refinement engine 201 and various components of the inventive system 200.

Query Information Set 202: Input to the system can be a set of query keywords, one or a list of URL(s) or domains, and/or a number of documents, which may be in various known formats, including, without limitation PDF, Microsoft Word and the like. The input depends on the type of service and customer. As an example a portal instead of making queries to an AdNetwork can first query Our Network with set of input keywords.

Page-Concept Index 203: The knowledge framework consists of our "Page-Concept Index" and our "Concept Graph". Page-Concept Index is an inverted index of preprocessed crawled pages or other categorized data like USPTO patent data with some global score, the same as traditional search engines. But each page is also tagged with the relevant concepts using the inventive Knowledge Extraction technology. The index can potentially contain a subset of the crawled webpages covering high quality pages or topic specific pages.

Search Interface 204: Present invention framework can also use top pages from other search engines, Wikipedia and other encyclopedia and other categorized data. We can also extract and tag knowledge and concepts for these pages in real time.

Click-Through Analyzer/index 205: We record not only keyword click-through but also concept click-through and measure diversity click-through for each and every query by looking at heterogeneity of the clicked ads. This information is used in conjunction with our conceptual expansion to provide highest click-through rates for each and every query.

Keyword/Concept Ad Pool 206: At initial stages we can provide keyword interfaces to wholesale advertisement networks to pull relevant ads. As part of the advertisement paradigm shift, the proposed infrastructure can constitute its own advertisement DB which provides conceptual advertisement versus current keyword advertisement paradigm. The advertisement framework provides an opportunity to bid on group of concepts and keywords versus current keyword expansion provided by Ad whole sellers.

Concept Graph 207: Concept Graph is core of our technology. We generate an automated taxonomy from the whole web and find concepts and their relationship, from the data. Unlike other manual taxonomies, KB is automatically generated from the data, so it has more resolution, where web or other types of data have more resolution. It is also as comprehensive as the data and is dynamically updated as the data is updated.

Advertising Result Set 208: Depending on the application, we return a set of related concepts, a set of queries to pull diverse ads, or an ordered list of advertisements. The potential types of services are listed in FIG. 3.

Figure 3:
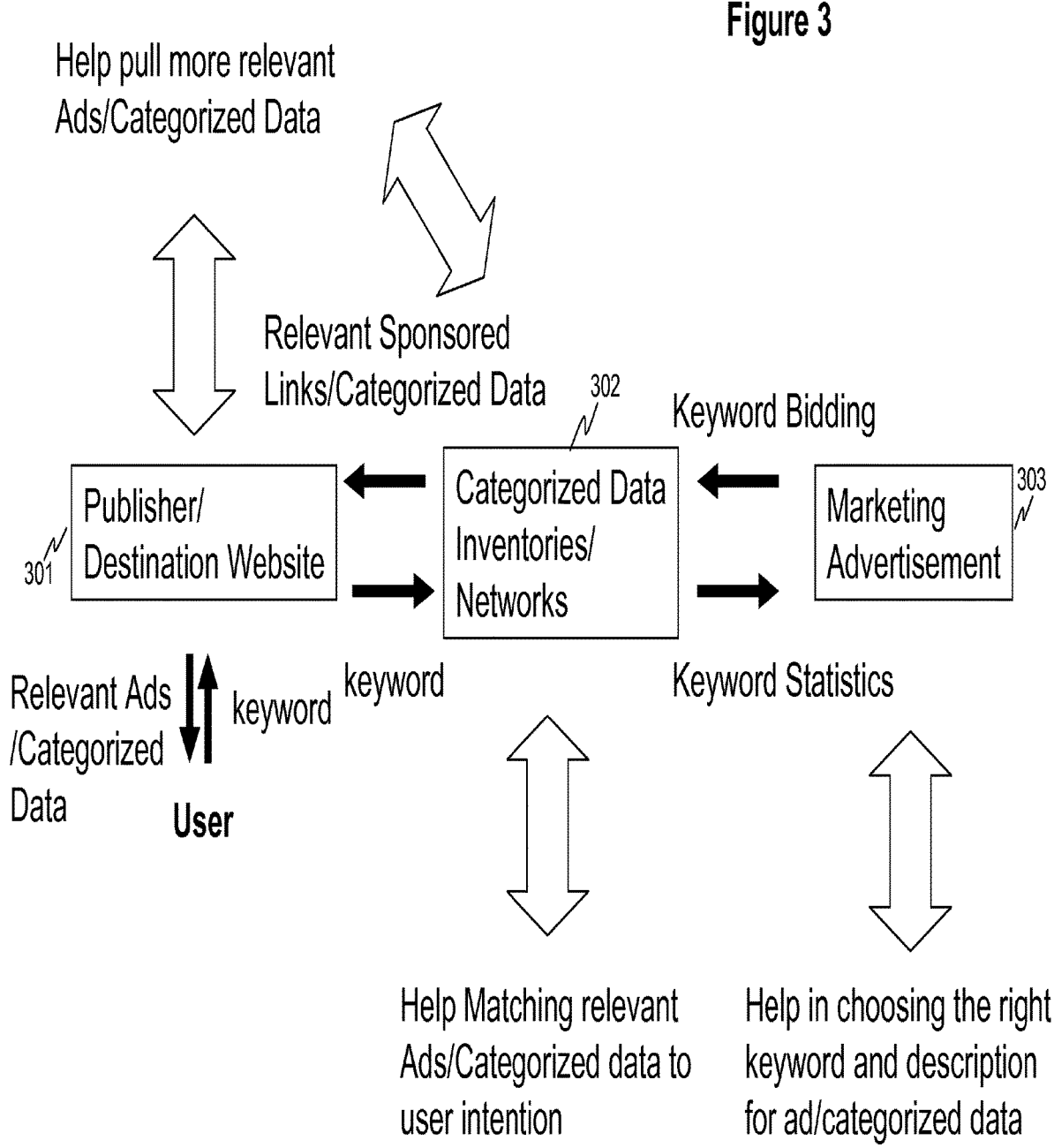
FIG. 3 is a schematic block diagram of a possible uses of the present invention according to one embodiment of the invention and its interaction with different components of an information and categorized data retrieval system.

FIG. 3 Illustrates possible scenarios and services provided by the inventive engine and how it can interact with different modules of an information retrieval system. Marketing and Advertising companies 303 bid on different keywords and provide relevant information for the advertisement including but not limited to Ad Information, Max CPC, Total Money, list of keywords, etc and passes it to the Categorized data inventory 302. Alternatively it can be a person or entity as listing a product on a shopping website (e.g. Ebay) providing a description for the listing. This process can be improved by an embodiment of the present invention by extending the keywords and description of the products/ads using the concept pool and knowledge extracted from the web. The keyword lists or a text or description or URL is passed to the system and a list of related concepts divided based on their topics is returned. The Categorized data inventory 302 which can be the Ad-Network, Comparison Shopping, Auction Website, or any other service that holds the Categorized data matches the input query to its inventory and returns the relevant results. This process can be improved by an embodiment of the invention where Inventory passes the query to a system running proposed method and the system finds the most relevant categorized data not only based on the description of the data but also using the relevant knowledge of the web as described in FIG. 2. Alternatively an implementing of an embodiment of the invention can interact with the publisher 301 to provide a list of relevant queries or keywords to pull relevant results or can pull the results from the inventory and just provide the more relevant results.

Figure 4:
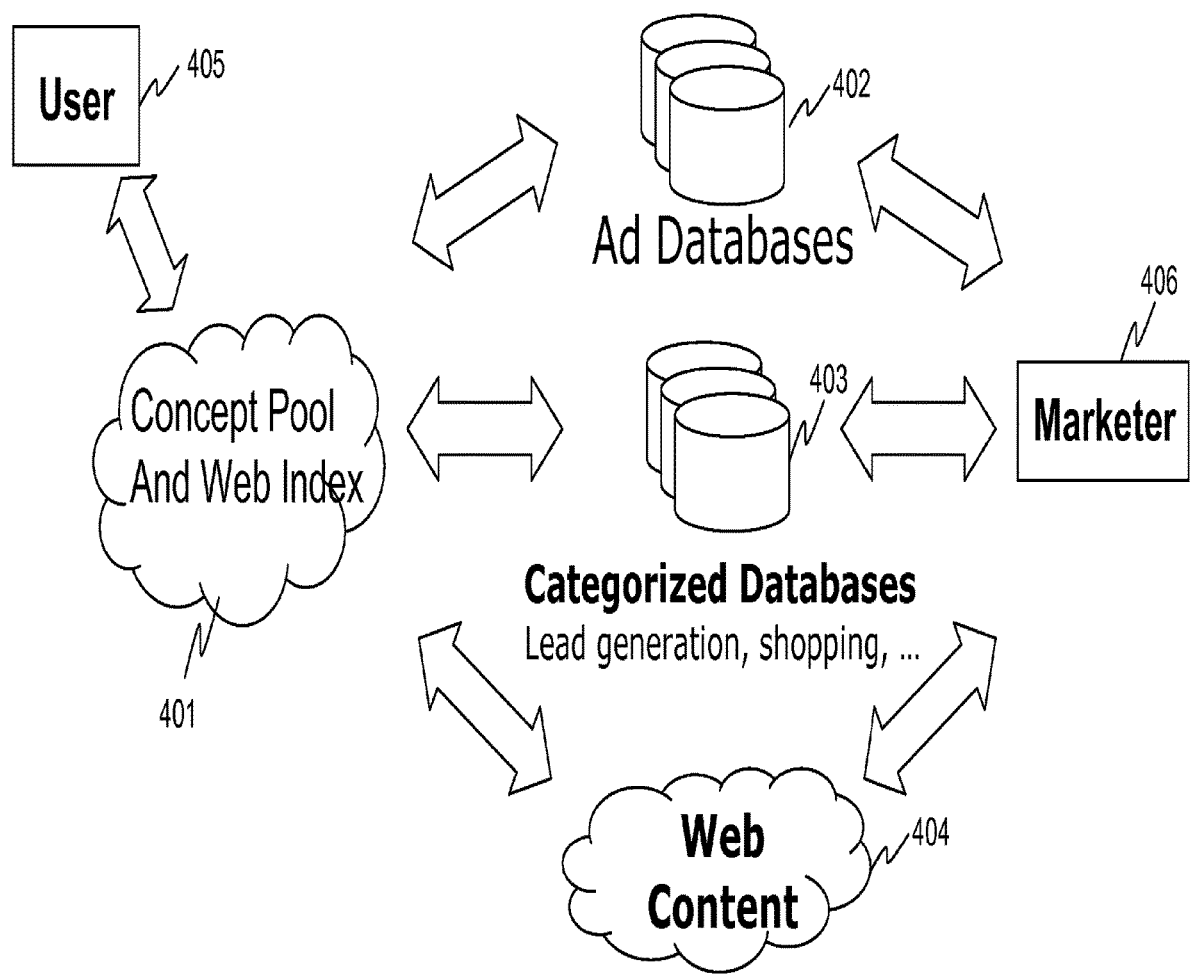
FIG. 4 is a schematic block diagram of possible uses of the present invention to rewrite the query to different categorized data inventories.

FIG. 4 Illustrates an application of an embodiment of the inventive concept in combining the knowledge concentrated in the unstructured data sources like WWW 404 to categorized data like shopping listings 402 and 403. The relevant concepts are first pulled from the web index 401, then information on the related product 406 is pulled from the relation DB of categorized data like shopping records 403 or an advertising material inventory 402. This information is provided to the user 405.

Figure 5:
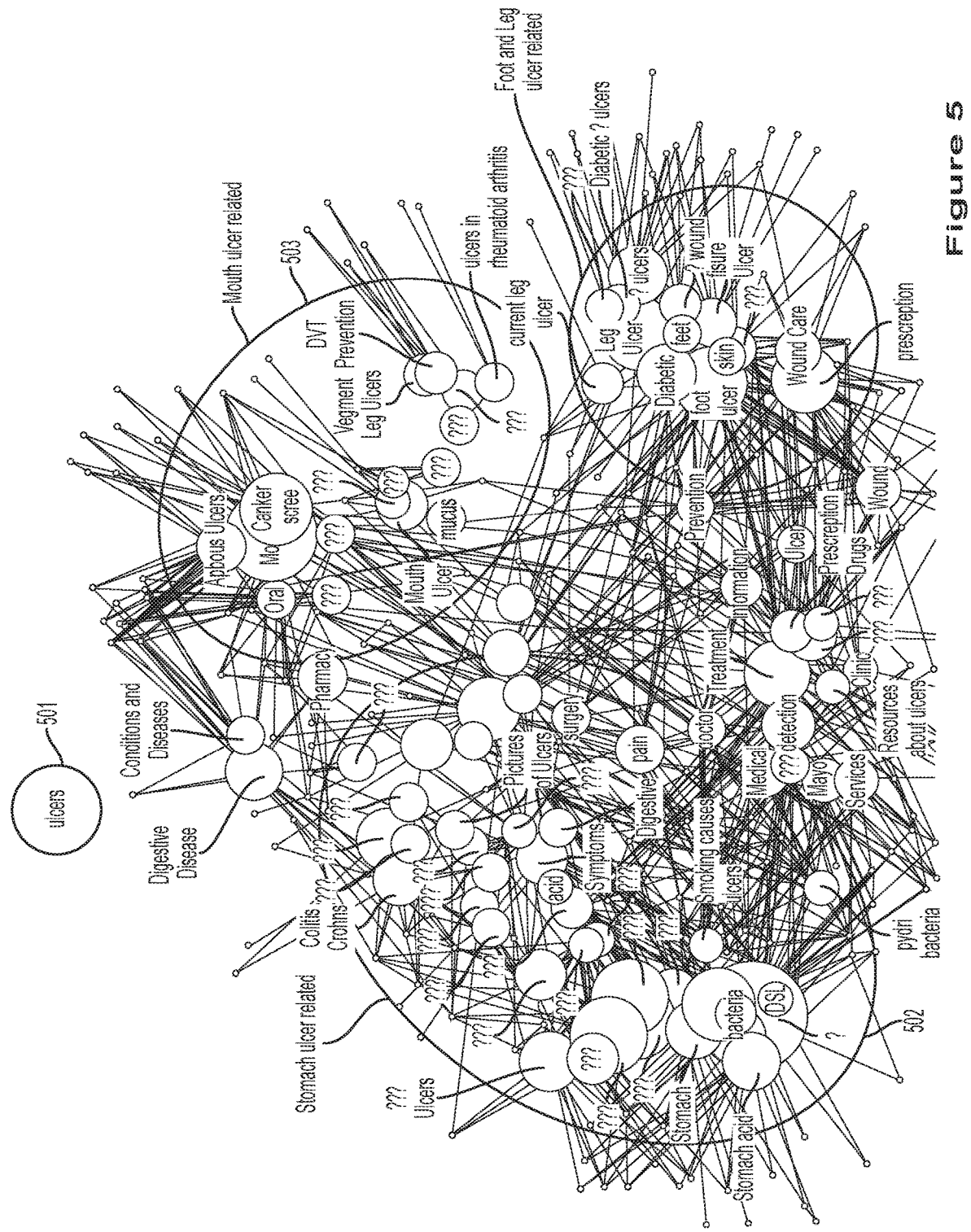
FIG. 5 is an example of region of interest in concept space for a particular query(ulcers) and how the region can be divided into different regions each, representing a particular context of user intention.

FIG. 5 Illustrates the region of interest in concept space for a particular query(ulcers) 501 and how the region can be divided into different regions each, representing a particular context of user intention, one region in context of stomach ulcers 502 one region includes mouth ulcers 503 and one region is in context of mostly foot and leg ulcers concepts 504.

Figure 6:
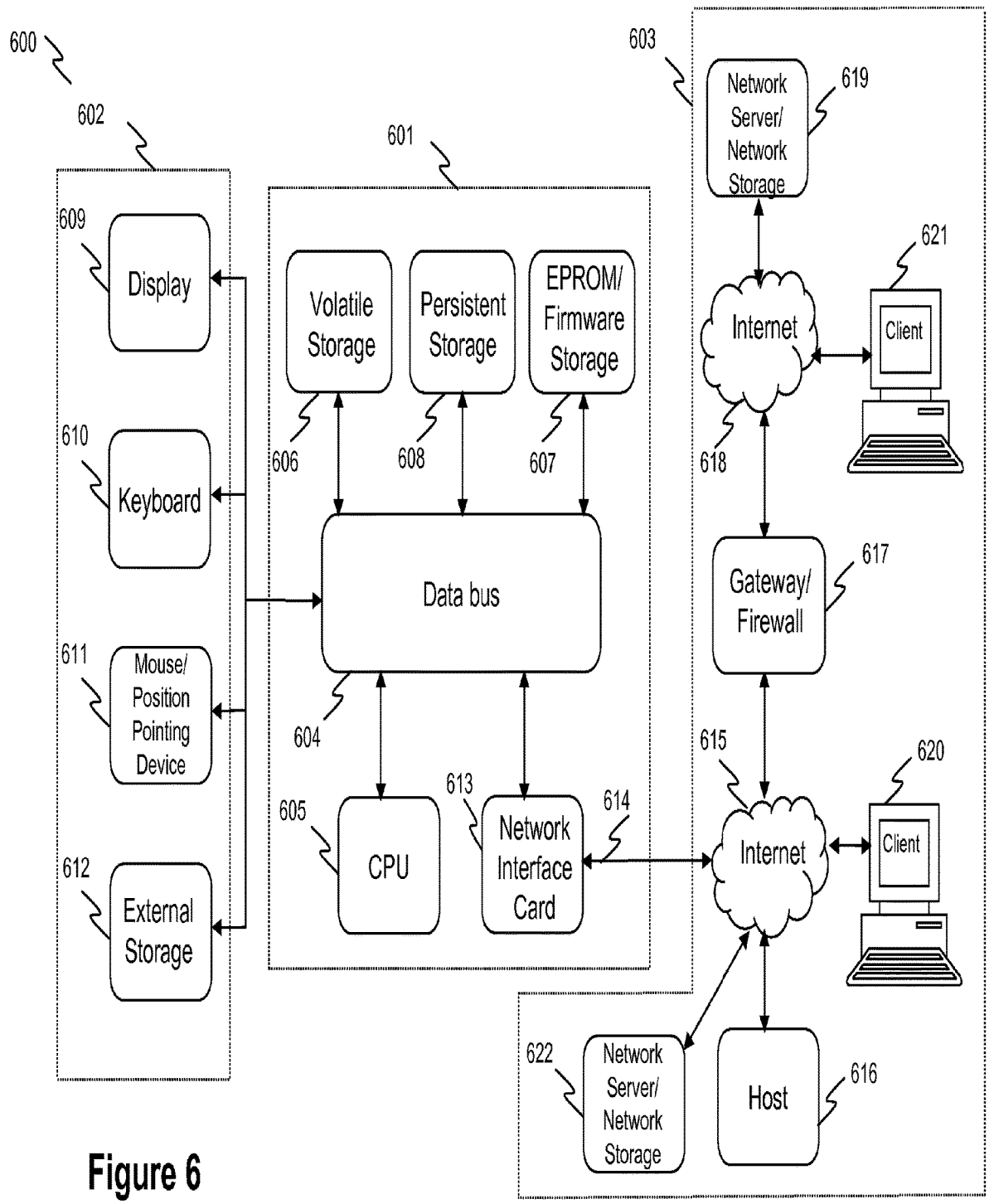
FIG. 6 illustrates an exemplary embodiment of a computer platform upon which the inventive system may be implemented.

FIG. 6 is a block diagram that illustrates an embodiment of a computer/server system 600 upon which an embodiment of the inventive methodology may be implemented. The system 600 includes a computer/server platform 601, peripheral devices 602 and network resources 603.

The computer platform 601 may include a data bus 604 or other communication mechanism for communicating information across and among various parts of the computer platform 601, and a processor 605 coupled with bus 601 for processing information and performing other computational and control tasks. Computer platform 601 also includes a volatile storage 606, such as a random access memory (RAM) or other dynamic storage device, coupled to bus 604 for storing various information as well as instructions to be executed by processor 605. The volatile storage 606 also may be used for storing temporary variables or other intermediate information during execution of instructions by processor 605. Computer platform 601 may further include a read only memory (ROM or EPROM) 607 or other static storage device coupled to bus 604 for storing static information and instructions for processor 605, such as basic input-output system (BIOS), as well as various system configuration parameters. A persistent storage device 608, such as a magnetic disk, optical disk, or solid-state flash memory device is provided and coupled to bus 601 for storing information and instructions.

Computer platform 601 may be coupled via bus 604 to a display 609, such as a cathode ray tube (CRT), plasma display, or a liquid crystal display (LCD), for displaying information to a system administrator or user of the computer platform 601. An input device 610, including alphanumeric and other keys, is coupled to bus 601 for communicating information and command selections to processor 605. Another type of user input device is cursor control device 611, such as a mouse, a trackball, or cursor direction keys for communicating direction information and command selections to processor 604 and for controlling cursor movement on display 609. This input device typically has two degrees of freedom in two axes, a first axis (e.g., x) and a second axis (e.g., y), that allows the device to specify positions in a plane.

An external storage device 612 may be connected to the computer platform 601 via bus 604 to provide an extra or removable storage capacity for the computer platform 601. In an embodiment of the computer system 600, the external removable storage device 612 may be used to facilitate exchange of data with other computer systems.

The invention is related to the use of computer system 600 for implementing the techniques described herein. In an embodiment, the inventive system may reside on a machine such as computer platform 601. According to one embodiment of the invention, the techniques described herein are performed by computer system 600 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 608. Volatile media includes dynamic memory, such as volatile storage 606. Transmission media includes coaxial cables, copper wire and fiber optics, including the wires that comprise data bus 604. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk from a remote computer. Alternatively, a remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on the data bus 604. The bus 604 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The computer platform 601 also includes a communication interface, such as network interface card 613 coupled to the data bus 604. Communication interface 613 provides a two-way data communication coupling to a network link 614 that is connected to a local network 615. For example, communication interface 613 may be an integrated services digital network (ISDN) card or a modem to provide a data communication connection to a corresponding type of telephone line. As another example, communication interface 613 may be a local area network interface card (LAN NIC)

to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 613 typically provides data communication through one or more networks to other network resources. For example, network link 614 may provide a connection through local network 615 to a host computer 616, or a network storage/server 617. Additionally or alternatively, the network link 613 may connect through gateway/firewall 617 to the wide-area or global network 618, such as an Internet. Thus, the computer platform 601 can access network resources located anywhere on the Internet 618, such as a remote network storage/server 619. On the other hand, the computer platform 601 may also be accessed by clients located anywhere on the local area network 615 and/or the Internet 618. The network clients 620 and 621 may themselves be implemented based on the computer platform similar to the platform 601.

Local network 615 and the Internet 618 both use electrical, electromagnetic or optical signals that carry digital data streams. The signals through the various networks and the signals on network link 614 and through communication interface 613, which carry the digital data to and from computer platform 601, are exemplary forms of carrier waves transporting the information.

Computer platform 601 can send messages and receive data, including program code, through the variety of network(s) including Internet 618 and LAN 615, network link 614 and communication interface 613. In the Internet example, when the system 601 acts as a network server, it might transmit a requested code or data for an application program running on client(s) 620 and/or 621 through Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution. In this manner, computer system 601 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive information retrieval system. It is intended that the specification and examples be considered as exemplary only, with a true scope and spirit of the invention being indicated by the following claims.

What is claimed:

1. A method, comprising:
    determining a plurality of concepts matching a search query;
    retrieving the plurality of concepts associated with search results using a page-concept index;
    determining related concepts related to the plurality of concepts matching the search query and the plurality of concepts associated with the search results using a concept graph, the concept graph being an automated taxonomy of online information resources, the concept graph comprising information on a plurality of concepts of the online information resources and further comprising relationships among the plurality of concepts;
    generating a set of concepts, the set of concepts comprising the plurality of concepts matching the search query, the plurality of concepts associated with the search results and the related concepts;
    identifying a potential user intention of a user corresponding to each grouping of top concepts, wherein each potential user intention comprises one aspect of the topic that the user could be looking for, when the user enters the search query;
    matching each potential user intentions of the user to an advertisement; and
    delivering each advertisement and the each results to the user.

2. The method of claim 1, further comprising providing a contextual advertisement for a web page by mapping the web page to the region of interest to generate potential intentions of users that visit the web page.

3. The method of claim 1, further comprising providing a summary of potential user intentions of the user to a landing site.

4. The method of claim 1, further comprising identifying search results matching each potential user intention of the user.

5. The method of claim 4, wherein the search results are categorized according to each potential user intention of the user.

6. The method of claim 1, wherein the search query comprises a set of keywords.

7. The method of claim 1, further comprising refining the region of interest.

8. The method of claim 1, further comprising clustering the set of concepts into a plurality of grouping of top concepts, wherein each grouping represents a potential user intention of the user.

9. A system, comprising:
    memory; and
    a processor coupled to the memory, the processor comprising:
        a page-concept index comprising an inverted index of a plurality of categorized data items, each data item being tagged with related concept information;
        a search engine to obtain top categorized data items from online information resources;
        a concept graph stored in the memory, the concept graph being an automated taxonomy of the online information resources, the concept graph comprising information on a plurality of concepts and relationships among the plurality of concepts, a query refinement engine to determine advertising material relevant to a user intention by determining a user intention of a search query based on the search query, the categorized data items, the related concept information, the plurality of concepts, and the relationships among the plurality of concepts, wherein the user intention is a plurality of groupings of the top related concepts, where each of the plurality of groupings covers one aspect of the topic that the user could be looking for when the user inputs the search query, and wherein the relationships among the plurality of concepts in the concept graph define a boundary of the grouping of top concepts, wherein each grouping represents a potential user intention of the user; and an output interface to output the advertising material, wherein the advertising material is identified by matching an advertisement to the user intention by matching the user intention with concept tags in the advertisement database.

10. The system of claim 9, wherein the plurality of categorized data items comprises at least one web page tagged with an associated concept.

11. The system of claim 9, wherein the search interface is further operable to obtain top web pages from at least one web search engine.

12. The system of claim 9, further comprising a click-through analyzer for storing click-through information related to the output user intention relevant information.

13. The system of claim 9, wherein the concept graph is stored in the memory prior to a search query being received at an input information module.

14. The system of claim 9, wherein determining the user intention of the search query comprises clustering the plurality of concepts and related concepts into a grouping of top concepts.

15. The system of claim 9, further comprising an advertising information pool comprising advertising materials stored in the memory, the advertising materials tagged with at least one concept or at least one context; the output interface to output the advertising material from the advertising information pool.

16. A non-transitory computer-readable storage medium embodying a set of computer-readable instructions that when executed, cause a processor to perform:

determining a plurality of concepts matching a search query;

retrieving the plurality of concepts associated with search results using a page-concept index;

determining related concepts related to the plurality of concepts matching the search query and the plurality of concepts associated with the search results using a concept graph, the concept graph being an automated taxonomy of online information resources, the concept graph comprising information on a plurality of concepts of the online information resources and further comprising relationships among the plurality of concepts;

generating a set of concepts, the set of concepts comprising the plurality of concepts matching the search query, the plurality of concepts associated with the search results and the related concepts;

wherein the relationships among the plurality of concepts in the concept graph define a boundary of a grouping of top concepts, wherein each grouping represents a potential user intention of a user;

identifying a potential user intention of the user corresponding to each grouping of top concepts, wherein each potential user intention comprises one aspect of the topic that the user could be looking for, when the user enters the search query; and matching each potential user intentions of the user to an advertisement; and delivering each advertisement and the search results to the user.

17. The non-transitory computer-readable storage medium of claim 16, further comprising providing, by the processor, a summary of potential user intentions of the user to a landing site.

18. The non-transitory computer-readable storage medium of claim 16, further comprising identifying, by the processor, search results matching each potential user intention of the user.

19. The non-transitory computer-readable storage medium of claim 16, wherein the search results are categorized according to each potential user intention of the user.

20. The non-transitory computer-readable storage medium of claim 16, further comprising clustering, by the processor, the set of concepts into a plurality of the grouping of top concepts.

* * * * *